United States Patent [19]

Schulz et al.

[11] 4,361,671
[45] Nov. 30, 1982

[54] NOVEL COMPOSITION AND PROCESS FOR PRODUCING SOLID RESIN THEREFROM

[75] Inventors: Johann G. Schulz, Pittsburgh; Daniel Margosian, Verona, both of Pa.

[73] Assignee: Gulf Research & Development Company, Pittsburgh, Pa.

[21] Appl. No.: 290,663

[22] Filed: Aug. 6, 1981

[51] Int. Cl.³ ............................................. C08G 63/42
[52] U.S. Cl. .................................. 524/879; 524/878; 528/98; 528/366
[58] Field of Search ............... 528/112, 115, 365, 366, 528/98; 260/37 AL, 37 EP; 524/878

[56] References Cited

U.S. PATENT DOCUMENTS 3,201,360  8/1965  Proops et al. .................. 528/112 X
3,793,247  2/1974  Fleming et al. .................. 528/112 X

FOREIGN PATENT DOCUMENTS 13785  6/1980  European Pat. Off. .

Primary Examiner—Earl A. Nielsen
Attorney, Agent, or Firm—Deane E. Keith; Forrest D. Stine; Joseph J. Carducci

[57] ABSTRACT

A novel composition of matter capable of being cured to a solid resinous material obtained as a result of the reaction of (1) a coal derivative comprising a mixture of monocyclic, polycyclic, multifunctional carboxylic acids, resulting from the interaction of coal with nitric acid with (2) an oxirane, and a process for producing a solid resinous material therefrom by heating the same under pressure.

43 Claims, No Drawings

NOVEL COMPOSITION AND PROCESS FOR PRODUCING SOLID RESIN THEREFROM

BACKGROUND OF THE INVENTION

1. Field of the Invention

This invention relates to a novel composition of matter capable of being cured to a solid resinous material obtained as a result of the reaction of (1) a coal derivative comprising a mixture of monocyclic, polycyclic, multifunctional carboxylic acids resulting from the interaction of coal with nitric acid with (2) an oxirane, and a process for producing a solid resinous material therefrom by heating the same under pressure.

2. Description of Prior Art

Hard, structurally-stable resinous plastic materials, highly resistant to chemical attack from water, acids and bases, and having excellent insulating properties are widely used in commerce. It is highly desirable to employ materials for the preparation of such resinous plastic bodies that are inexpensive and readily available.

SUMMARY OF THE INVENTION

We have discovered a novel composition of matter made from materials that are inexpensive and readily available and that is capable of being cured to obtain hard, structurally-stable resinous plastic material, highly resistant to attack from water, acids and bases and which possesses excellent insulating properties.

The novel composition of matter requires but two components:

(1) a coal derivative comprising a mixture of monocyclic, polycyclic, multifunctional carboxylic acids, resulting from the interaction of coal with nitric acid, hereinafter referred to as "coal derivatives" and (2) an oxirane.

The coal derivatives can be obtained by subjecting coal to reaction with nitric acid in an aqueous medium, wherein the weight ratios of coal (on a moisture-free basis and ash-free basis), nitric acid (as 100 weight percent nitric acid), and water are in the ranges of about 1:10:1 to about 1:0.1:10, preferably about 1:5:1 to about 1:0.5:5, at a temperature of about 15° to about 200° C., preferably about 50° to about 100° C., and a pressure of about atmospheric to about 1000 pounds per square inch gauge (about 100 to about 6900 kPa), preferably about atmospheric to about 500 pounds per square inch gauge (about 100 to about 3450 kPa), for about 0.5 to about 15 hours, preferably about two to about six hours. The aqueous nitric acid used generally has a concentration of about five to about 90 weight percent, preferably about 10 to about 70 weight percent. At the end of the reaction period, the reaction product is treated to remove water, unreacted nitric acid and/or ash therefrom that may be in any conventional or suitable manner, for example, by filtration, evaporation, etc., and the product remaining is the monocyclic, polycyclic, multifunctional carboxylic acid coal derivative ("coal derivative") used herein. The functional groups that are present include hydroxyl, carboxyl, ether, ester, nitrogen-containing functionalities, such as nitro, etc. Exemplary procedures, for example, that can be used herein, and whose disclosures are incorporated herein, are those employed in U.S. Pat. No. 4,052,448 of Schulz et al, dated Oct. 4, 1977, and in our copending U.S. patent application Ser. No. 290,662, entitled "Process for Preparing Organic Acids," filed concurrently herewith.

The second component required for the preparation of the novel composition of matter defined and claimed herein is an oxirane or a mixture of oxiranes. An example of oxiranes that can be used herein are those defined by the following formula:

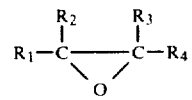

wherein $R_1$, $R_2$, $R_3$ and $R_4$, the same or different, can be hydrogen or straight- or branched-chain alkyl groups, preferably straight-chain, having from one to 10 carbon atoms, preferably from one to three carbon atoms. Particularly desirable oxiranes for use herein are ethylene oxide and propylene oxide.

The amounts of coal derivatives and oxirane used can vary over a wide range, but in general for each 100 grams of coal derivative there are used from about 0.1 to about 10 mols of oxirane, preferably from about 0.3 to about 5.0 mols of oxirane.

The novel composition herein suitable for molding is obtained by heating a stirred mixture of said coal derivative and said oxirane at a temperature of about 25° to about 200° C., preferably about 35° to about 150° C., and a pressure of about atmospheric to about 4500 pounds per square inch gauge, or even higher (about 100 to about 31,000 kPa); preferably about atmospheric to about 1000 pounds per square inch gauge (about 100 to about 6900 kPa), for about 10 minutes to about 120 hours, preferably about 30 minutes to about 10 hours. No solvent is required, but if one is used it need only be used in amounts sufficient to maintain the contents of the reactor in the liquid phase. Polar solvents, including water, can be used. Examples of such solvents include methanol, ethanol, tetrahydrofuran, combinations thereof, etc. The reaction can be carried out with a catalyst, but in a preferred embodiment, no catalysts are employed. Either base or acid catalysts can be used. By "base catalyst" we mean to include compounds that will function as an electron donor, for example, alkali metal hydroxides, such as sodium hydroxide, amines, such as triethylamine, etc. By "acid catalyst" we mean to include compounds that will function as electron acceptors, for example, Lewis Acids, such as boron trifluoride and tin octanoate, Bronsted acids, such as paratoluene sulfonic acid and sulfuric acid, etc. The amount of catalyst used can range up to about five weight percent, but preferably in the range of about 0.1 to about 1.0 weight percent, based upon the coal derivative. If a solvent has been used, the same can be removed from the reaction product at the end of the reaction in any convenient manner, for example, by distillation or evaporation. If excess oxirane is present, it can also be removed by distillation or evaporation.

The resulting novel composition is capable of being cured to a solid resinous material. In a preferred embodiment, to increase the hardness of the cured product, prior to being cured the novel composition can be mixed with a filler, such as glass fibers, sand, clay, chalk, etc. When fillers are used, the weight ratio thereof to the novel composition can be up to about 4:1, but preferably in the range of about 1:1 to about 2.5:1. Prior to molding, or curing, an acid catalyst, as defined above, is added to the molding mixture in a weight ratio of about 0.001:1 to about 0.1:1, preferably about 0.002:1 to about 0.004:1. Preferably, in order to facilitate the subsequent molding operation, the mixture is precured by heating the same at a temperature of about 70° to about 120° C., preferably about 90° to about 100° C. for about 30 minutes to about 24 hours, preferably about one to about 1.5 hours.

The desired solid resinous product is obtained by subjecting the above composition, for example, in a mold, to a temperature of about 140° to about 250° C., preferably about 150° to about 200° C., and a pressure of about 500 to about 20,000 pounds per square inch gauge (about 3450 to about 138,000 kPa), preferably about 2000 to about 5000 pounds per square inch gauge (about 13,800 to about 34,500 kPa), for about five seconds to about 24 hours, or even higher, preferably about 15 seconds to about 30 minutes.

The product obtained is a hard, structurally stable resinous product highly resistant to chemical attack from water, acids and bases and will possess excellent insulating properties.

DESCRIPTION OF PREFERRED EMBODIMENTS

In each of the four coal derivative preparation examples described below, a German Braunkohle was used having the following analysis, on a moisture-free basis:
64.37 wt % carbon;
5.06 wt % hydrogen;
25.09 wt % oxygen;
0.14 wt % sulfur;
0.605 wt % nitrogen; and
3.88 wt % ash.
The coal contained 10.0 weight percent water.

EXAMPLE I

To a flask containing 70 grams of 70 weight percent aqueous nitric acid, there was added over a period of 55 minutes a slurry containing 54.0 grams, on a moisture-free basis, of the above coal and 115 grams of water. During the operation, the contents were constantly stirred and maintained at atmospheric pressure and at a temperature of 55° C. At the end of the addition period, the contents of the flask were maintained at 55° C. for an additional hour. During the operation, any nitrogen oxides that may have formed were permitted to escape from the reaction zone. At the end of the reaction the contents of the flask were subjected to a vacuum of 28 inches of mercury and 42° C. to remove water therefrom, and the water was analyzed for its nitric acid concentration and was found to have a nitric acid concentration of 11.5 percent. The remaining solids, amounting to 65.5 grams, herein defined as "Coal Derivative A," were exhaustively extracted at ambient temperature and pressure with methanol. The extract was subjected to a vacuum of 28 inches of mercury and 13° C. to remove methanol therefrom. The amount of solvent-insoluble material amounted to 20.3 g., while the amount of solvent-soluble material, herein defined as "Coal Derivative B," amounted to 40.9 grams.

EXAMPLE II

This example is similar to Example I except that the coal was added to the reaction zone in two separate stages. In the first stage, the slurry added to the nitric acid in the flask contained 45 grams of coal, on a moisture-free basis, and 90 grams of water. This time the holding period after the addition of the slurry was one-half hour. At the end of the one-half hour holding period there was added to the reactor contents a second slurry containing nine grams of coal, on a moisture-free basis, and 25 grams of water over a ten-minute period while the temperature was maintained at 55° C., as in the first stage addition. The contents of the reactor were held at one hour at 55° C. Water and any remaining nitric acid were then removed, as described in Example I, yielding a solid material herein described as "Coal Derivative C". Following exhaustive methanol extraction and subsequent removal of the solvent from the extract, as described in Example I, a solvent-insoluble material and a solvent-soluble material, herein defined as "Coal Derivative D", were isolated.

EXAMPLE III

The reaction stage described in Example I was repeated. Instead of subjecting the reactor contents to a drying step as in Example I, the reactor contents herein were subjected to filtration. The water was removed from the aqueous filtrate by subjecting it to a vacuum of 28 inches of mercury at 42° C. and the distillate was analyzed for its nitric acid content. The water-soluble solid portion remaining was analyzed for its ash content and for its water-soluble coal derivative content. The water-insoluble portion remaining after filtration was exhaustively extracted with methanol, following the procedure of Example I, to recover solvent-soluble, water-soluble coal derivative material, herein defined as "Coal Derivative E."

EXAMPLE IV

Example III was repeated, except that the nitric acid reaction stage was identical to the procedure used in Example II.

The solvent-soluble, water insoluble coal derivative material obtained is herein defined as "Coal Derivative F."

In each of the coal derivative-oxirane reaction examples described below, selected amounts of an appropriate coal derivative obtained from the above procedures was used. The data obtained are summarized below in Table I.

EXAMPLE V

To a one-liter autoclave vessel, equipped with a stirrer, were added 100 grams of Coal Derivative E and 425 grams of propylene oxide. The reaction mixture was heated with constant stirring to 130° C., and this temperature was maintained for one hour. Prior to cooling, the pressure amounted to 200 pounds per square inch gauge (1380 kPa). At the end of the reaction the contents of the vessel were subjected to a vacuum of 28 inches of mercury and 12° C. to remove unreacted oxirane therefrom. The remaining solids, amounting to 147.0 grams, were used for the molding investigations.

EXAMPLE VI

Into a flask at a temperature of −30° C. there was condensed 125 grams of ethylene oxide. To this was added 20 grams of Coal Derivative E over a period of one hour. The contents were then warmed to 10° C., and that temperature was maintained for eight hours. The reaction mixture was then allowed to warm to 20° C., maintaining this temperature for 24 hours. During the entire operation, the contents were constantly stirred and maintained at atmospheric pressure. The product was then worked up as in Example V.

EXAMPLES VII–XIV

In each of this series of runs to 50 grams of a selected coal derivative and 560 milliliters of solvent there was added in the reaction vessel over a period of 6–7.5 hours 210 grams of ethylene oxide. During the operation the contents were constantly stirred and maintained at atmospheric pressure and at a temperature of 40° to 50° C. The product was then worked up as in Example V.

TABLE I

| Example | Coal Derivative | Grams of Coal Derivative | Grams of Oxirane | Solvent | Milliliters of Solvent | Temp., °C. | Time, Hours |
|---|---|---|---|---|---|---|---|
| V | E | 100 | 425 | None | — | 130 | 1.0 |
| VI | E | 20 | 125 | None | — | −30 to 20 | 33.0 |
| VII | F | 50 | 210 | Ethanol | 560 | 40 to 50 | 6.0 |
| VIII | A | 50 | 220 | Methanol | 560 | 40 to 50 | 7.25 |
| IX | C | 47 | 220 | Methanol | 560 | 40 to 50 | 7.25 |
| X | B | 50 | 210 | Ethanol | 560 | 40 to 50 | 6.0 |
| XI | B | 44 | 210 | Methanol | 560 | 38 to 56 | 7.25 |
| XII | D | 51 | 210 | Methanol | 560 | 32 to 54 | 6.0 |
| XIII | D | 51 | 220 | Methanol | 560 | 44 to 54 | 7.25 |
| XIV | D | 1000 | 4400 | Methanol | 11,200 | 24 to 66 | 164.5 |

The following series of examples, described below, are representative molding runs.

EXAMPLES XV TO XXXII

A selected amount of product from Table I was well mixed with catalyst and filler. This mixture was then heated at about 100° C. and at atmospheric pressure for about one hour. After this time the contents were placed in a die and molded at the pressures, temperatures and times described in Table II below.

out departing from the spirit and scope thereof, and therefore only such limitations should be imposed as are indicated in the appended claims.

We claim:

1. A novel composition of matter capable of being cured to a solid resinous material obtained as a result of the reaction of (1) a coal derivative comprising a mixture of monocyclic, polycyclic, multi-functional carboxylic acids resulting from the interaction of coal with nitric acid with (2) an oxirane defined by the following formula:

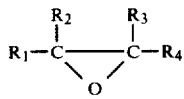

wherein $R_1$, $R_2$, $R_3$ and $R_4$, the same or different, can be hydrogen or an alkyl group having from one to 10 carbon atoms.

2. The novel composition of claim 1 wherein $R_1$, $R_2$, $R_3$ and $R_4$, the same or different, can be hydrogen or an

TABLE II

| Ex. No. | Product from Example, Wt % | Filler, Wt % | Catalyst Wt % | Pressure Temp. °C. | Pressure Time, Hrs. | Molding Temp. °C. | Molding Time, Hrs. | Pressure Psig | Pressure (kPa) | Barcol Hardness |
|---|---|---|---|---|---|---|---|---|---|---|
| XV | V, 29.1 | Sand, 70.3 | 0.6 | 100 | 1.0 | 165 | 0.1 | 3000 | (20,700) | 40 |
| XVI | V, 29.2 | Sand, 70.6 | 0.2 | 102 | 0.5 | 165 | 0.1 | 3100 | (21,390) | 43 |
| XVII | V, 29.2 | Sand, 70.6 | 0.2* | 80 | 1.5 | 200 | 0.1 | 3700 | (25,530) | 41 |
| XVIII | VI, 29.1 | Sand, 70.3 | 0.6* | 100 | 1.0 | 200 | 0.2 | 8000 | (55,200) | 36 |
| XIX | VII, 29.1 | Sand, 70.5 | 0.4 | 105 | 1.5 | 200 | 0.2 | 3400 | (23,460) | 43 |
| XX | VIII, 48.6 | Sand, 51.0 | 0.4 | 102 | 1.5 | 165 | 3.5 | 5200 | (35,880) | 26 |
| XXI | VIII, 48.6 | Sand, 51.0 | 0.4 | 102 | 1.5 | 165 | 1.0 | 6400 | (44,160) | 26 |
| XXII | IX, 48.6 | Sand, 51.0 | 0.4 | 102 | 1.5 | 165 | 1.0 | 8000 | (55,200) | 34 |
| XXIII | X, 29.1 | Sand, 70.6 | 0.3 | 100 | 1.0 | 165 | 0.1 | 4200 | (28,980) | 44 |
| XXIV | X, 29.1 | Sand, 70.3 | 0.6 | 100 | 2.0 | 165 | 0.2 | 3200 | (22,080) | 44 |
| XXV | XI, 29.1 | Sand, 70.3 | 0.6 | 100 | 1.5 | 165 | 0.1 | 3200 | (22,080) | 47 |
| XXVI | XI, 29.1 | Sand, 70.3 | 0.6 | 80 | 2.0 | 165 | 0.1 | 3700 | (25,530) | 49.5 |
| XXVII | XII, 29.1 | Sand, 70.3 | 0.6 | 100 | 1.5 | 165 | 0.1 | 3200 | (22,080) | 48 |
| XXVIII | XII, 29.2 | Chalk, 70.4 | 0.4 | 100 | 1.5 | 165 | 0.1 | 3300 | (22,770) | 32 |
| XXIX | XIII, 29.1 | Sand, 70.3 | 0.6 | 100 | 1.5 | 165 | 0.1 | 3300 | (22,770) | 49 |
| XXX | XIII, 29.7 | Sand, 47.4 Glass Fiber, 22.5 | 0.4 | 100 | 1.5 | 165 | 0.1 | 3100 | (21,390) | 59 |
| XXXI | XIV, 29.2 | Sand, 70.5 | 0.3 | 100 | 1.0 | 165 | 0.1 | 3000 | (20,700) | 45 |
| XXXII | XIV, 29.7 | Sand, 47.4 Glass Fiber, 22.5 | 0.4 | 100 | 1.0 | 165 | 0.1 | 3000 | (20,700) | 49.7 |

*Catalyst was sulfuric acid; in all other examples, tin octonoate.

From Table II it can be seen that in each example a solid resinous material was obtained having an excellent Barcol hardness. Each of the materials, moreover, exhibited excellent structural strength, was highly resistant to chemical attack and possessed excellent insulating properties. The molded products demonstrated heat distortion temperature ranges of about 100° to about 130° C.

Obviously, many modifications and variations of the invention, as hereinabove set forth, can be made with-alkyl group having from one to three carbon atoms.

3. The novel composition of claim 1 wherein said oxirane is ethylene oxide.

4. The novel composition of claim 1 wherein said oxirane is propylene oxide.

5. The novel composition of claim 1 wherein said coal derivative is obtained by subjecting coal to reaction with nitric acid in an aqueous medium, wherein the weight ratios of coal, nitric acid and water are in a weight ratio of about 1:10:1 to about 1:0.1:10 at a temperature of about 15° to about 200° C. and a pressure of about atmospheric to about 1000 pounds per square inch gauge for about 0.5 to about 15 hours.

6. The novel composition of claim 1 wherein said coal derivative is obtained by subjecting coal to reaction with nitric acid in an aqueous medium, wherein the weight ratios of coal, nitric acid and water are in a weight ratio of about 1:5:1 to about 1:0.5:5 at a temperature of about 50° to about 100° C. and a pressure of about atmospheric to about 500 pounds per square inch gauge for about two to about six hours.

7. The novel composition of claim 5 wherein the coal derivative, comprising a mixture of monocyclic, polycyclic, multifunctional carboxylic acids resulting from the interaction of coal with nitric acid, prior to reaction with said oxirane, is subjected to drying to remove water therefrom.

8. The novel composition of claim 6 wherein the coal derivative, comprising a mixture of monocyclic, polycyclic, multifunctional carboxylic acids resulting from the interaction of coal with nitric acid, prior to reaction with said oxirane is subjected to drying to remove water therefrom.

9. The novel composition of claim 7 wherein a polar solvent extract of said coal derivative is reacted with said oxirane.

10. The novel composition of claim 8 wherein a polar solvent extract of said coal derivative is reacted with said oxirane.

11. The novel composition of claim 7 wherein a methanol extract of said coal derivative is reacted with said oxirane.

12. The novel composition of claim 8 wherein a methanol extract of said coal derivative is reacted with said oxirane.

13. The novel composition of claim 7 wherein an ethanol extract of said coal derivative is reacted with said oxirane.

14. The novel composition of claim 8 wherein an ethanol extract of said coal derivative is reacted with said oxirane.

15. The novel composition of claim 1 wherein about 0.1 to about 10 mols of oxirane are used for each 100 grams of coal derivative and the reaction is carried out at a temperature of about 25° to about 200° C. and a pressure of about atmospheric to about 4500 pounds per square inch gauge for about 10 minutes to about 120 hours.

16. The novel composition of claim 1 wherein about 0.3 to about 5.0 mols of oxirane are used for each 100 grams of coal derivative and the reaction is carried out at a temperature of about 35° to about 150° C. and a pressure of about atmospheric to about 1000 pounds per square inch gauge for about 30 minutes to about 10 hours.

17. A process for producing a solid resinous material which comprises heating the novel composition of matter of claim 1 at an elevated temperature and an elevated pressure for a time sufficient to obtain said solid resinous material.

18. A process for producing a solid resinous material which comprises heating the novel composition of matter of claim 2 at an elevated temperature and an elevated pressure for a time sufficient to obtain said solid resinous material.

19. A process for producing a solid resinous material which comprises heating the novel composition of matter of claim 3 at an elevated temperature and an elevated pressure for a time sufficient to obtain said solid resinous material.

20. A process for producing a solid resinous material which comprises heating the novel composition of matter of claim 4 at an elevated temperature and an elevated pressure for a time sufficient to obtain said solid resinous material.

21. A process for producing a solid resinous material which comprises heating the novel composition of matter of claim 5 at an elevated temperature and an elevated pressure for a time sufficient to obtain said solid resinous material.

22. A process for producing a solid resinous material which comprises heating the novel composition of matter of claim 6 at an elevated temperature and an elevated pressure for a time sufficient to obtain said solid resinous material.

23. A process for producing a solid resinous material which comprises heating the novel composition of matter of claim 7 at an elevated temperature and an elevated pressure for a time sufficient to obtain said solid resinous material.

24. A process for producing a solid resinous material which comprises heating the novel composition of matter of claim 8 at an elevated temperature and an elevated pressure for a time sufficient to obtain said solid resinous material.

25. A process for producing a solid resinous material which comprises heating the novel composition of matter of claim 9 at an elevated temperature and an elevated pressure for a time sufficient to obtain said solid resinous material.

26. A process for producing a solid resinous material which comprises heating the novel composition of matter of claim 10 at an elevated temperature and an elevated pressure for a time sufficient to obtain said solid resinous material.

27. A process for producing a solid resinous material which comprises heating the novel composition of matter of claim 11 at an elevated temperature and an elevated pressure for a time sufficient to obtain said solid resinous material.

28. A process for producing a solid resinous material which comprises heating the novel composition of matter of claim 12 at an elevated temperature and an elevated pressure for a time sufficient to obtain said solid resinous material.

29. A process for producing a solid resinous material which comprises heating the novel composition of matter of claim 13 at an elevated temperature and an elevated pressure for a time sufficient to obtain said solid resinous material.

30. A process for producing a solid resinous material which comprises heating the novel composition of matter of claim 14 at an elevated temperature and an elevated pressure for a time sufficient to obtain said solid resinous material.

31. A process for producing a solid resinous material which comprises heating the novel composition of matter of claim 15 at an elevated temperature and an elevated pressure for a time sufficient to obtain said solid resinous material.

32. A process for producing a solid resinous material which comprises heating the novel composition of matter of claim 16 at an elevated temperature and an elevated pressure for a time sufficient to obtain said solid resinous material.

33. The process of claim 17 wherein said temperature is in the range of about 140° to about 250° C., the pressure is in the range of about 500 to about 20,000 pounds per square inch gauge, and the time is in the range of about five seconds to about 24 hours.

34. The process of claim 17 wherein said temperature is in the range of about 150° to about 200° C., the pressure is in the range of about 2000 to about 5000 pounds per square inch gauge, and the time is in the range of about 15 seconds to about 30 minutes.

35. The process of claim 33 wherein prior to heating said novel composition of matter, as defined, the same is precured by heating at a temperature in the range of about 70° to about 120° C. for about 30 minutes to about 24 hours.

36. The process of claim 34 wherein prior to heating said novel composition of matter, as defined, the same is precured by heating at a temperature in the range of about 90° to about 100° C. for about one to about 1.5 hours.

37. The process of claim 17 wherein prior to heating the novel composition of matter it is mixed with a filler so that the weight ratio of said filler to said novel composition of matter is up to about 4:1.

38. The process of claim 17 wherein prior to heating the novel composition of matter it is mixed with a filler so that the weight ratio of said filler to said novel composition of matter is in the range of about 1:1 to about 2.5:1.

39. The process of claim 17 wherein said heating is carried out in the presence of an acid catalyst wherein the weight ratio of said catalyst to said novel composition of matter is in the range of about 0.001:1 to about 0.1:1.

40. The process of claim 17 wherein said heating is carried out in the presence of an acid catalyst wherein the weight ratio of said catalyst to said novel composition of matter is in the range of about 0.002:1 to about 0.004:1.

41. The process of claim 38 wherein said acid catalyst is tin octanoate.

42. The process of claim 38 wherein said acid catalyst is sulfuric acid.

43. The process of claim 38 wherein said acid catalyst is para-toluene sulfonic acid.

* * * * *